US011463203B2

United States Patent
Lu et al.

(12) United States Patent
(45) Date of Patent: US 11,463,203 B2
Oct. 4, 2022

(10) Patent No.:

(54) HARQ TRANSMISSION SCHEME USING MULTIPLE PARALLEL HARQ THREADS

(71) Applicant: MediaTek Singapore Pte. Ltd., Singapore (SG)

(72) Inventors: Kaiying Lu, San Jose, CA (US); Jianhan Liu, San Jose, CA (US); Chao-Chun Wang, San Jose, CA (US); James Chih-Shi Yee, San Jose, CA (US); Yongho Seok, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/909,874

(22) Filed: Jun. 23, 2020

(65) Prior Publication Data

US 2020/0412491 A1    Dec. 31, 2020

Related U.S. Application Data

(60) Provisional application No. 62/866,061, filed on Jun. 25, 2019.

(51) Int. Cl.

| | |
|---|---|
| *H04W 72/04* | (2009.01) |
| *H04L 1/18* | (2006.01) |
| *H04L 1/16* | (2006.01) |
| *H04L 5/00* | (2006.01) |
| *H04W 80/02* | (2009.01) |
| *H04W 80/08* | (2009.01) |

(52) U.S. Cl.
CPC .......... *H04L 1/1819* (2013.01); *H04L 1/1614* (2013.01); *H04L 1/1621* (2013.01); *H04L 5/0055* (2013.01); *H04W 80/02* (2013.01); *H04W 80/08* (2013.01)

(58) Field of Classification Search
CPC ............... H04L 1/1819; H04L 1/1614; H04L 1/1621; H04L 1/1671; H04L 1/1822; H04L 5/0055; H04W 80/02; H04W 80/08
See application file for complete search history.

(56) References Cited

U.S. PATENT DOCUMENTS

2017/0126363 A1*   5/2017   Wang .................... H04L 1/1671
2017/0230149 A1*   8/2017   Wang .................... H04L 1/1819
(Continued)

FOREIGN PATENT DOCUMENTS

| | | |
|---|---|---|
| WO | 2015006640 A1 | 1/2015 |
| WO | 2019103452 A1 | 5/2019 |

*Primary Examiner* — Tejis Daya
*Assistant Examiner* — Mahbubul Bar Chowdhury

(57) ABSTRACT

Embodiments described herein provide apparatus and methods for performing HARQ operations using parallel HARQ threads, where each new transmission of a MPDU/A-MPDU/PSDU triggers the activation of a HARQ thread. Each HARQ thread contains one or more HARQ coding words or coding units. A HARQ thread index is setup by a transmission opportunity (TXOP) holder for a corresponding PSDU and is used to identify HARQ threads. Multiple HARQ threads can be aggregated into one PPDU for transmission (or retransmission). The maximum number of HARQ threads can be negotiated between AP and non-AP STAs based on buffer requirements, for example. A HARQ thread can end when all MPDUs associated with the HARQ thread have been decoded or other predetermined conditions are met.

19 Claims, 13 Drawing Sheets

(56) References Cited

U.S. PATENT DOCUMENTS

2020/0052832 A1\* 2/2020 Tian .................. H04L 1/0026
2020/0280399 A1 9/2020 Kim et al.
2021/0044389 A1\* 2/2021 Kim .................. H04W 12/06
2021/0045009 A1\* 2/2021 Chun ................. H04L 1/1812
2021/0099253 A1\* 4/2021 Kim .................. H04L 1/1812

\* cited by examiner

| | HARQ thread bitmap | No. of OFDM symbol segments | HARQ thread parameters | ... | No. of OFDM symbols segments | HARQ thread parameters |
|---|---|---|---|---|---|---|
| Bits | 8 | 5 | TBD | ... | 5 | TBD |

FIG. 6

HARQ TRANSMISSION SCHEME USING MULTIPLE PARALLEL HARQ THREADS

CROSS-REFERENCE TO RELATED APPLICATIONS

This application claims the benefit of and priority to provisional patent application Ser. No. 62/866,061, with filing date Jun. 25, 2019, by Kai Ying Lu, et al., which is hereby incorporated by reference in its entirety.

FIELD

Embodiments of the present invention generally relate to the field of wireless communications. More specifically, embodiments of the present invention relate to systems and methods for error correction and control of transmissions within a wireless communication network.

BACKGROUND

Modern electronic devices typically send and receive data with other electronic devices wirelessly using Wi-Fi, and often data that is sent by a transmitter to a receiver is lost or corrupted. This can be due to interference from other electronic device, or other common issues with wireless transmission of data, such as weather or obstructions that physically block the wireless signal. For these reasons, several techniques for retransmitting data have been developed so that data intended for the receiver can be delivered, even if retransmission is required.

Two common techniques for retransmitting data are Automatic Repeat Request (ARQ) and Forward Error Coding (FEC). ARQ is a technique that requires the receiver to send an acknowledgement ("ACK") packet when data has been received. If the data is not delivered or delivered with an error, no ACK is sent to the transmitter. In this case, when the transmitter does not receive an ACK, the data is retransmitted. While this approach leads to very high reliability when transmitting data, sending an ACK for every data packet that is received leads to decreased data throughput when errors occur frequently in the channel.

FEC is a technique that allows a receiver to correct errors in the transmission using error coding procedures and metadata. For instance, data can be sent with a cyclic redundancy check (CRC) digest. FEC reduces errors and only moderately decreases throughput. However, the use of FEC does not lead to high reliability, as some errors may not be corrected using the error coding.

Hybrid automatic repeat request (hybrid ARQ or HARQ) combines high-rate forward error-correcting coding and ARQ error-control. In standard ARQ, redundant bits are added to data to be transmitted based on an error-detecting (ED) code such as a CRC as referred to above. Receivers detecting a corrupted message will request a new message from the sender, the original data is then encoded with a forward error correction (FEC) code, and the parity bits are sent along with the message or transmitted upon request when a receiver detects an error. HARQ performs better than ordinary ARQ in poor signal conditions, but in its simplest form this comes at the expense of significantly lower throughput in good signal conditions.

SUMMARY

In view of the above, what is needed is an approach to HARQ that performs error correction while improving the efficiency of the retransmission scheme. Accordingly, embodiments of the present invention provide systems and methods for performing HARQ operations using one or more HARQ threads, where each new transmission of a MPDU/A-MPDU/PSDU will trigger the creating of a new HARQ thread. Each HARQ thread contains one or more HARQ coding words or coding units. A HARQ thread index is setup by a transmission opportunity (TXOP) holder for a corresponding PSDU and used to identify HARQ threads. Multiple HARQ threads can be aggregated into one PPDU. The maximum number of HARQ threads can be negotiated between AP and non-AP STAs based on buffer requirements, for example.

According to one embodiment, a method of retransmitting data using a hybrid automatic repeat request (HARQ) thread is disclosed. The method includes receiving an acknowledgement associated with a prior data transmission indicating missed data of the prior data transmission for a first HARQ thread, and based on the acknowledgment, transmitting a Physical Layer Convergence Procedure (PLCP) Protocol Data Unit (PPDU) including a first HARQ retransmission for the first HARQ thread, and a new data transmission According to some embodiments, the missed data of the prior data transmission includes HARQ coding units corresponding to missed HARQ coding units.

According to some embodiments, the new data transmission includes a PLCP Service Data Unit (PSDU) for a second HARQ thread.

According to some embodiments, the PPDU further includes a second HARQ retransmission for a second HARQ thread.

According to some embodiments, the method includes receiving a second acknowledgement including a block acknowledgement (BA) for received PSDUs.

According to some embodiments, the PPDU includes a plurality of HARQ threads, and the acknowledgement includes a block acknowledgement (BA) indicating received Media Access Control (MAC) Protocol Data Units (MPDUs) for the plurality of HARQ thread, and HARQ coding unit feedback for the plurality of HARQ threads.

According to some embodiments, the acknowledgement includes a HARQ acknowledgment type indication set in a BA control field, a HARQ thread index indication for retransmission, and/or a HARQ coding unit indication for retransmission.

According to some embodiments, the HARQ coding unit indication includes a HARQ thread bitmap.

According to some embodiments, the PPDU includes a plurality of HARQ threads and a HARQ SIG field indicating thread information for the plurality of HARQ threads.

According to some embodiments, the HARQ thread information includes a number of orthogonal frequency-division multiplexing (OFDM) symbol segments for the plurality of HARQ threads, and HARQ thread transmission parameters for the plurality of HARQ threads.

According to a different embodiment, a method of providing hybrid automatic repeat request (HARQ) feedback responsive to a HARQ transmission is disclosed. The method includes receiving a Physical Layer Convergence Procedure (PLCP) Protocol Data Unit (PPDU) including a HARQ retransmission for a first HARQ thread and/or a new data transmission associated with a second HARQ thread, and transmitting an acknowledgment responsive to receiving the PPDU. The acknowledgment indicates MPDUs of HARQ threads that are acknowledged, HARQ coding units of the HARQ threads that require HARQ retransmission, or that no HARQ coding units of the HARQ threads are acknowledged (NACK).

According to some embodiments, the PPDU further includes a second HARQ retransmission for a third HARQ thread, and the acknowledgment indicates acknowledged MPDUs of at least one of: the first HARQ thread, the second HARQ thread, and the third HARQ thread.

According to some embodiments, the method includes receiving a second PPDU including a second retransmission for the first HARQ thread, a first retransmission for the second HARQ thread, and a second new data transmission for a third HARQ thread, the second PPDU is transmitted responsive to a device receiving the acknowledgment.

According to some embodiments, the acknowledgement includes a block acknowledgement (BA) indicating received Media Access Control (MAC) Protocol Data Units (MPDUs) for the HARQ thread and HARQ coding unit feedback for the HARQ threads.

According to some embodiments, the acknowledgement includes a HARQ acknowledgment type indication set in a BA control field, a HARQ thread index indication for retransmission, and/or a HARQ coding unit indication for retransmission.

According to some embodiments, the HARQ coding unit indication includes a HARQ thread bitmap.

According to a different embodiment, a device for performing hybrid automatic repeat request (HARQ) retransmission in a wireless network is disclosed. The device includes a transceiver configured to send and receive data on the wireless network, a memory, and a processor operable to cause the transceiver to receive an acknowledgement associated with a prior data transmission indicating missed data of the prior data transmission for a first HARQ thread, decoded data of the prior data transmission is stored in the memory, and based on the acknowledgment, transmit a response Physical Layer Convergence Procedure (PLCP) Protocol Data Unit (PPDU) including a first HARQ retransmission for the first HARQ thread, and a new data transmission.

According to some embodiments, the PPDU further includes a plurality of HARQ threads, and the acknowledgement includes a block acknowledgement (BA) indicating received Media Access Control (MAC) Protocol Data Units (MPDUs) for the plurality of HARQ threads, and HARQ coding unit feedback for the plurality of HARQ threads.

According to some embodiments, the acknowledgement includes at least one of: a HARQ acknowledgment type indication set in a BA control field, a HARQ thread index indication for retransmission, and a HARQ coding unit indication for retransmission.

According to some embodiments, the HARQ coding unit indication includes a HARQ thread bitmap.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 is a block diagram of an exemplary HARQ thread information element in a HARQ SIG field associated with HARQ threads for performing HARQ retransmission according to embodiments of the present invention.

DETAILED DESCRIPTION

Figure 1:
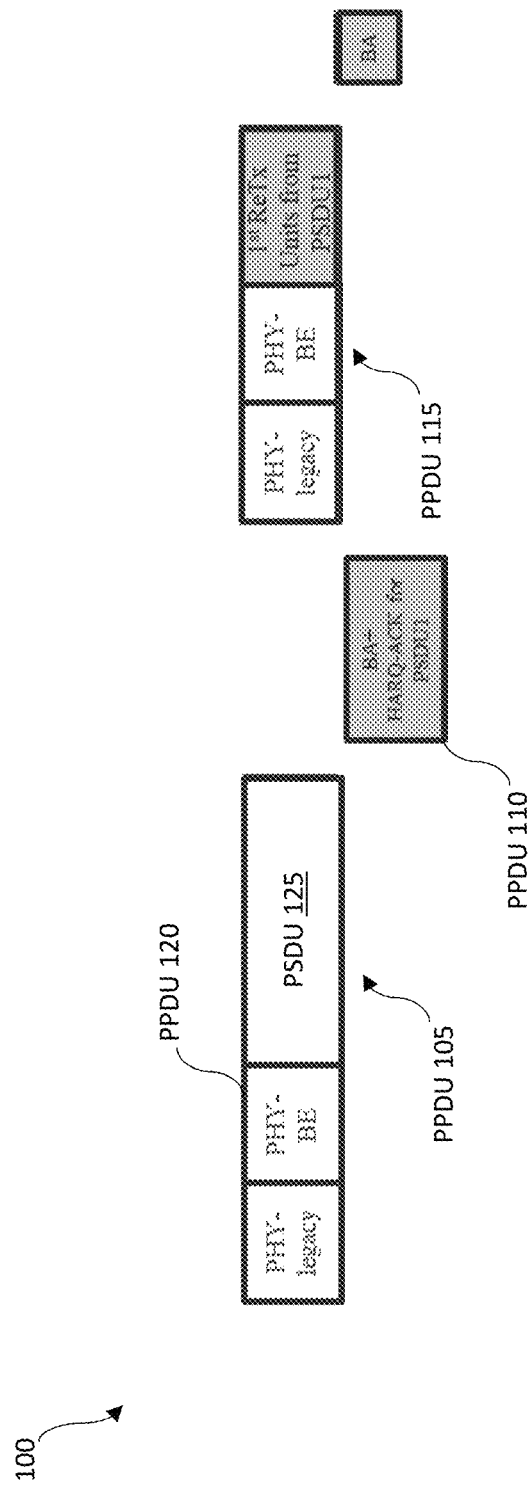
FIG. 1 is a block diagram of a transmission timing diagram depicting an exemplary HARQ operation using HARQ threads according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 10 and 11) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel HARQ Transmission Scheme Using Multiple Parallel HARQ Threads

As used herein, the term "EHT" may refer generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Embodiments described herein provide apparatus and methods for performing HARQ operations using parallel HARQ threads, where each new transmission of a Media Access Control (MAC) Protocol Data Unit (MPDU)/Aggregate-MPDU (A-MPDU)/Physical Layer Convergence Procedure (PLCP) Service Data Unit (PSDU) triggers the activation of a HARQ thread. Each HARQ thread contains one or more HARQ coding words or coding units. A HARQ thread index is setup by a transmission opportunity (TXOP) holder for a corresponding PSDU and is used to identify HARQ threads. Multiple HARQ threads can be aggregated into one PLCP Protocol Data Unit (PPDU) for transmission (or retransmission). The maximum number of HARQ threads can be negotiated between AP and non-AP STAs based on buffer requirements, for example. A HARQ thread can end when all MPDUs associated with the HARQ thread have been decoded or other predetermined conditions are met.

With regard to FIG. 1, an exemplary transmission timing diagram 100 depicting an exemplary HARQ operation using HARQ threads is depicted according to embodiments of the present invention. PPDU 105 contains a new transmission that is associated with HARQ thread 1, and PPDU 115 contains a retransmission for HARQ thread 1. A HARQ thread index is setup by a transmission opportunity (TXOP) initiator for PSDU 125 in PPDU 105 and is used to identify HARQ threads corresponding to specific PSDUs (e.g., PSDU 125). Packets that are received with an error are stored, and a subsequent packet includes data (e.g., coding words) that can be used in combination with the stored data to correct the error (a "retransmission").

PPDU 110 is transmitted by a TXOP initiator (e.g., transmitter) that sets up HARQ thread 1 that includes one or more HARQ coding words. The transmission of a PPDU 105 triggers the creation of HARQ thread 1. After receiving feedback including a HARQ-ACK from a TXOP responder (e.g., receiver) in block acknowledgment (BA) 110, the TXOP initiator starts the retransmission of unacknowledged HARQ coding words (or "coding units" representing groups of HARQ coding words) for HARQ thread 1 in PPDU 115. The HARQ coding words or coding units are used to correct the errors (unacknowledged packets) detected in PPDU 105.

A buffer is used to temporarily store the HARQ coding words or coding units of HARQ thread 1 and can be cleared by the TXOP initiator when the packets are acknowledged (received without error), or when the number of retransmissions has reached the maximum allowed times (e.g., 4 times). The HARQ-SIG field included in PHY-BE header 120 of PPDU 105 indicates HARQ thread information for HARQ thread 1. A PPDU containing an original transmission (e.g., PPDU 105) and a PPDU containing a retransmitted codeword (e.g., PPDU 115) are associated with the same HARQ thread (e.g., HARQ thread 1).

Figure 2:
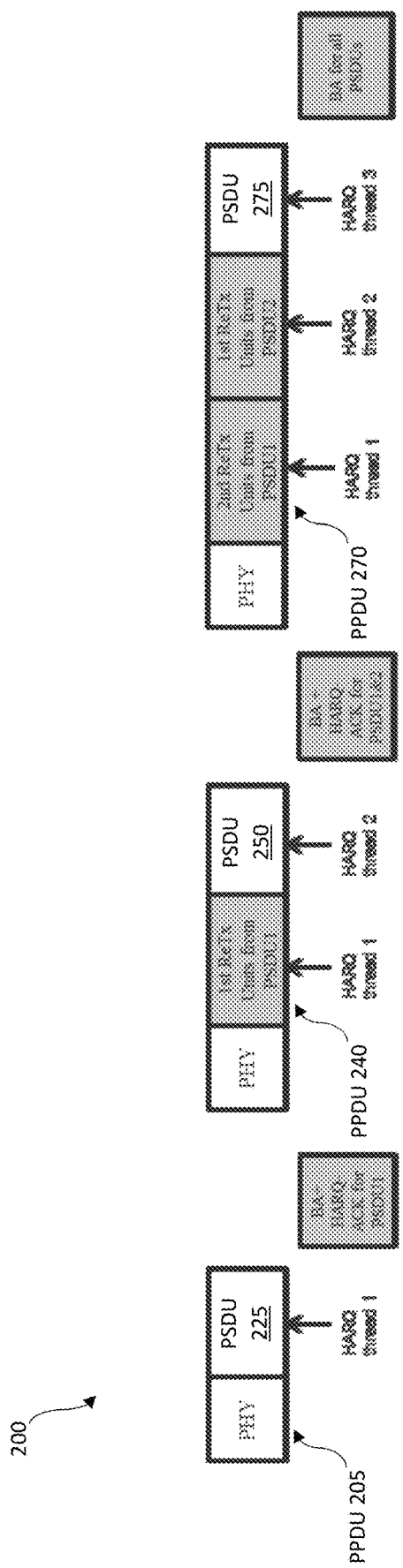
FIG. 2 is a block diagram of an exemplary transmission timing diagram depicting an exemplary HARQ operation using multiple HARQ threads according to embodiments of the present invention.

With regard to FIG. 2, an exemplary transmission timing diagram 200 depicting exemplary HARQ operations using HARQ threads is depicted according to embodiments of the present invention. PPDU 205 contains a new transmission (data) PSDU 225 that is associated with HARQ thread 1, and PPDU 240 contains a retransmission for HARQ thread 1 as well as a new transmission PSDU 250. As depicted in FIG. 2, multiple HARD threads can be associated with different PSDUs transmitted in different PPDUs. For example, PPDU 270 includes a retransmission for PSDU 225 (HARQ thread 1), a retransmission for PSDU 250 (HARQ thread 2), and a new transmission PSDU 275 (HARQ thread 3).

A TXOP initiator (e.g., transmitter) can pipeline multiple HARQ threads (e.g., HARQ threads 1-3) into one PPDU in a TXOP, and each HARQ thread can be assigned to a different HARQ thread index location or value. After receiving feedback from a TXOP responder (e.g. a receiver), the TXOP initiator begins retransmission of unacknowledged HARQ coding words or units for the corresponding HARQ thread(s) and/or new transmissions. Retransmission(s) associated with currently used HARQ threads and new transmission associated a new/unused HARQ thread can be aggregated in one PPDU. According to some embodiments, 8 HARQ threads are managed concurrently. HARQ SIG field of the PHY headers can include HARQ thread information. The maximum number of HARQ threads required can be negotiated between AP and non-AP STAs.

Figure 3:
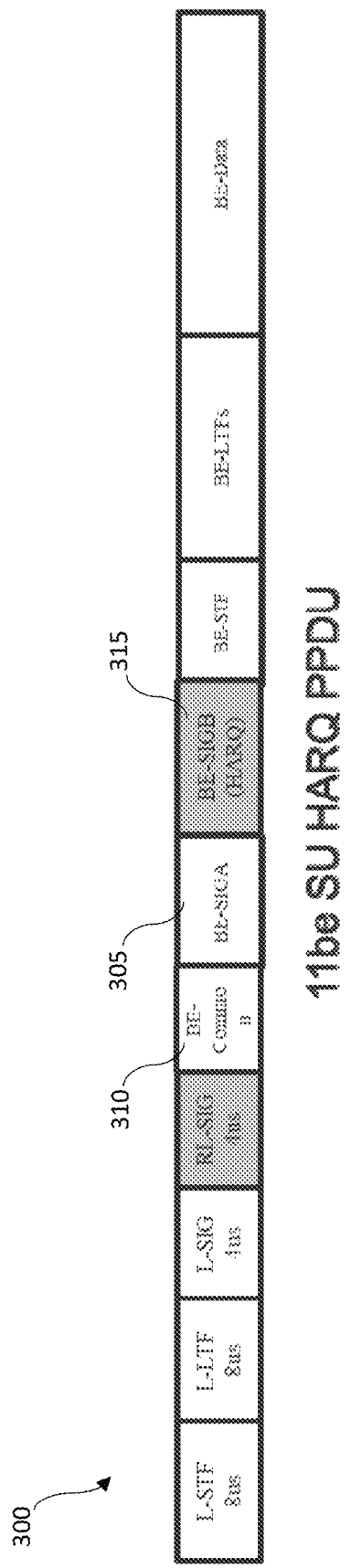
FIG. 3 is a block diagram of an exemplary BE Single User (SU) PPDU for performing a HARQ retransmission process according to embodiments of the present invention.

With regard to FIG. 3, a block diagram of an exemplary BE Single User (SU) PPDU 300 for performing a HARQ retransmission process is depicted according to embodiments of the present invention. A HARQ indication can be carried in BE-SIGA field 305 or BE Common Field 310. BE-SIGB(HARQ) 315 field is present when a HARQ operation is indicated using one of these fields. HARQ operation related information is included in BE-SIGB (HARQ) field 315. RA/TA/Duration information can be included in the BE-SIGC (e.g., Short Basic Service Set (BSS) ID, BSS Color, short STA MAC address, STA ID, TXOP duration, etc.) as depicted in FIG. 4.

Figure 4:
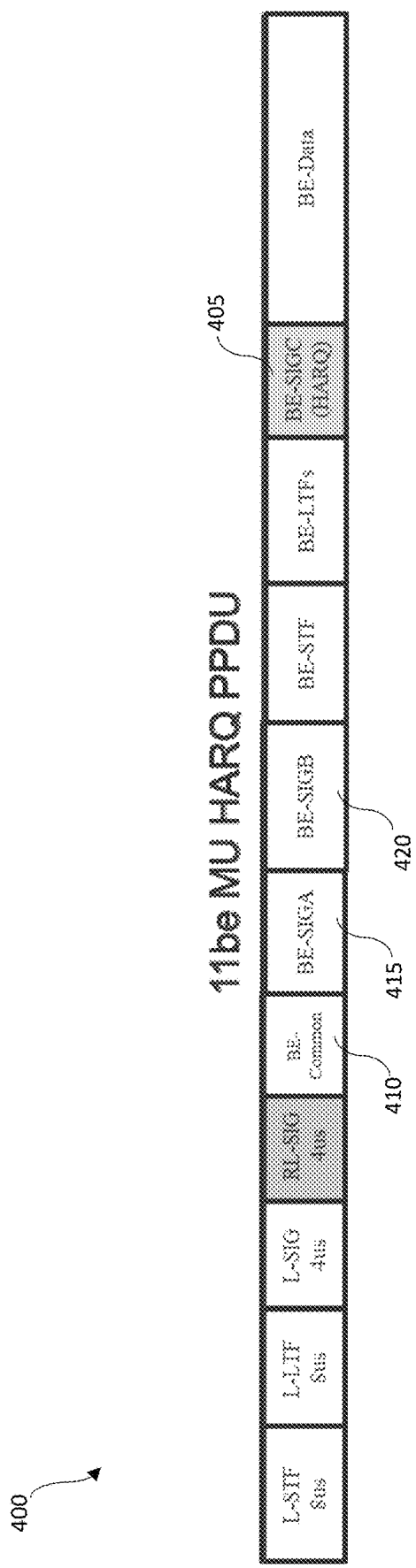
FIG. 4 is a block diagram of an exemplary BE Multi User (MU) PPDU for performing a HARQ retransmission process using a BE-SIGC field according to embodiments of the present invention.

With regard to FIG. 4, a block diagram of an exemplary BE Multi User (MU) PPDU 400 for performing a HARQ retransmission process using BE-SIGC field 405 is depicted according to embodiments of the present invention. The HARQ indication can be inserted in BE Common field 410 or BE-SIGA field 415. BE-SIGC (HARQ) field 405 is present (per user) if a HARQ operation is indicated in the BE Common Field 410 or BE-SIGA field 415. HARQ operation related information is included in BE-SIGC (HARQ) field 405 includes HARQ thread information (e.g., a HARQ thread bitmap). RA/TA/Duration information (e.g., Short BSSID, BSS Color, short STA MAC address, STA ID, TXOP duration) can be included in the BE-SIGC 405 or BE-SIGA field 415.

BE-SIGC field 405 can be modulated (e.g., fixed or adaptive modulation) as indicated in BE-SIGB 420. Modulation and coding schemes (MCS) other than those listed in BE-SIGB 420 can also be used. Independent cyclic-redundancy check (CRC) and beamforming can also be enabled.

Figure 5:
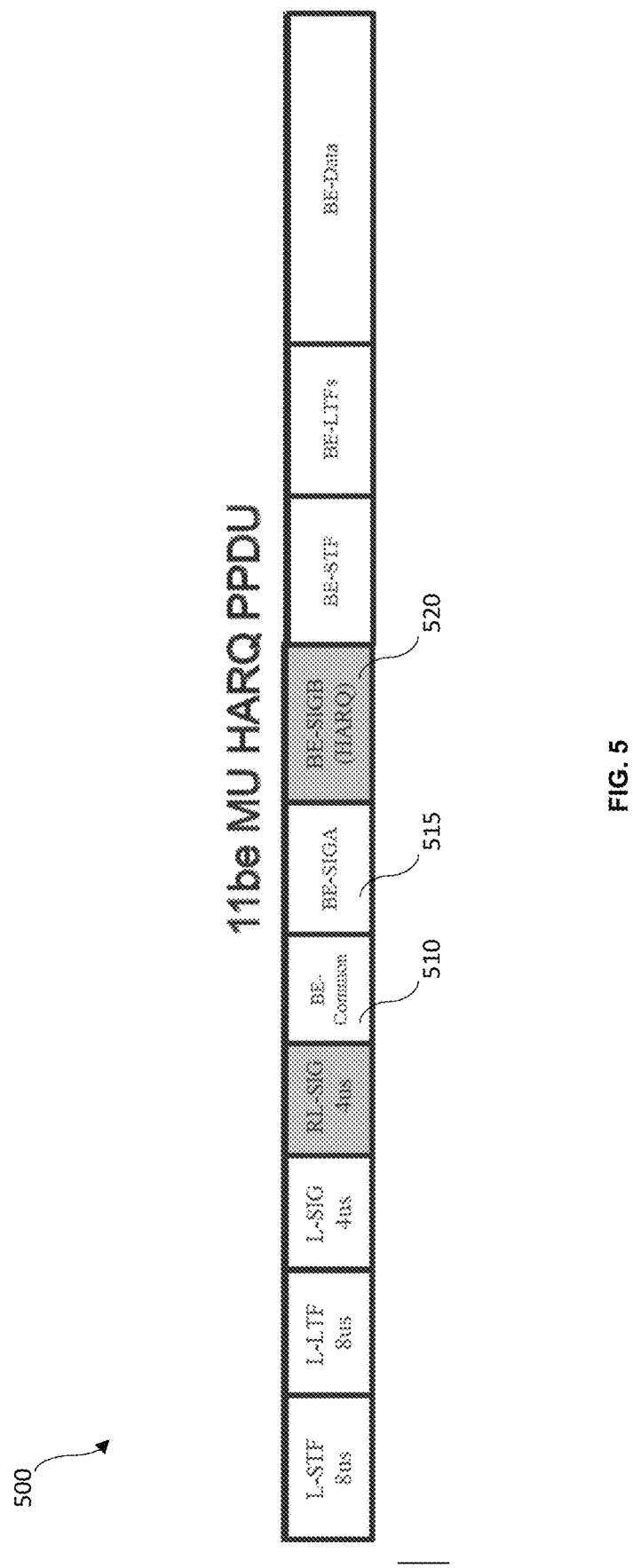
FIG. 5 is a block diagram of an exemplary BE Multi User (MU) PPDU for performing a HARQ retransmission process using BE-SIGB field according to embodiments of the present invention.

With regard to FIG. 5, a block diagram of an exemplary BE Multi User (MU) PPDU 500 for performing a HARQ retransmission process using BE-SIGB field is depicted according to embodiments of the present invention. A HARQ indication can be included in BE Common field 510 or BE-SIGA field 515. BE-SIGB(HARQ) field 520 includes HARQ related information (per user) such as HARQ thread information (e.g., a HARQ thread bitmap). BE-SIGB can be fixed modulated or adaptive modulated as indicated in BE-SIGA and an independent CRC can be enabled.

With regard to FIG. 6, an exemplary HARQ thread information element 600 associated with HARQ threads for performing HARQ retransmission is depicted according to embodiments of the present invention. The HARQ thread information element 600 is included in a HARQ SIG field (e.g., a SIG field of a PHY-BE header). The length of the HARQ SIG field (e.g., BE-SIGB or BE-SIGC) is variable depending on the number of ongoing HARQ threads included in the PPDU. A HARQ thread bitmap field 605 indicates HARQ threads that are active/ongoing. For example, an 8 bit HARQ thread bitmap 605 can indicate the status of up to 8 ongoing HARQ threads. HARQ thread information element 600 also includes the number of OFDM symbol segments field 610 indicating the number of OFDM symbol segments for each ongoing HARQ thread. As depicted in FIG. 6, 5 bits can be used to indicate up to 32 orthogonal frequency-division multiplexing (OFDM) symbol segments for each ongoing HARQ thread. The symbol segment can be a portion of an OFDM symbol (e.g., ¼ of an OFDM symbol) or can be multiple OFDMA symbols (e.g., 4 OFDM symbols).

HARQ parameters field 615 can indicate HARQ coding words/units of each ongoing HARQ thread can include MCS, HARQ coding words/units index or HARQ bitmap, transmission indication/version, or retransmission indication/version. The HARQ thread parameters 615 can include detailed design data for HARQ thread parameters independent of the HARQ thread information structure. For example, one MPDU (or MPDU segment) can correspond to one HARQ coding unit (with one CRC).

Figure 7:
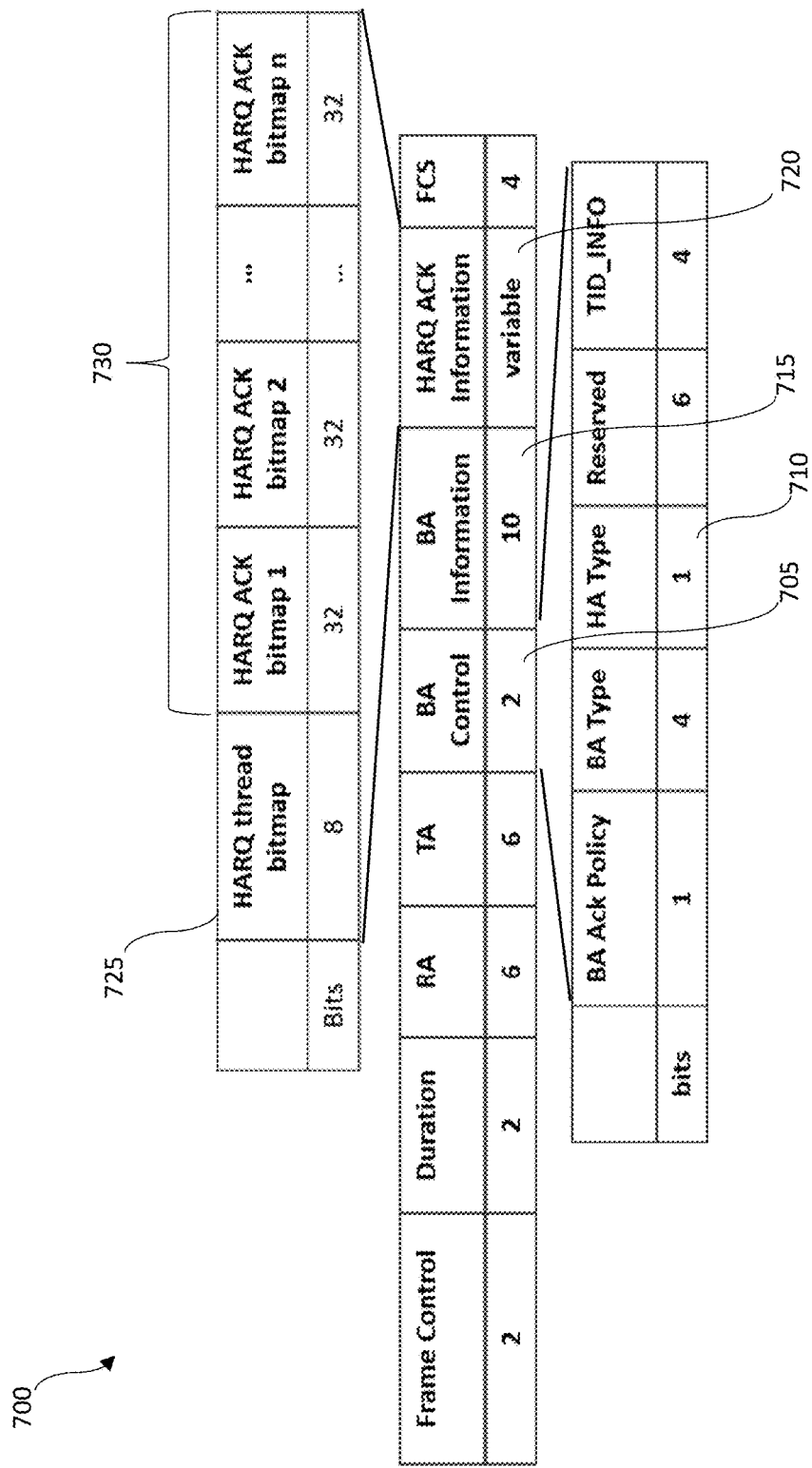
FIG. 7 is a block diagram of an exemplary BA frame including HARQ ACK information for performing a HARQ retransmission using ARQ/HARQ coding unit feedback according to embodiments of the present invention.

With regard to FIG. 7, an exemplary BA Frame 700 including a HARQ ACK information subfield 705 for performing a HARQ retransmission using ARQ/HARQ coding word feedback is depicted according to embodiments of the present invention. HA Type subfield 710 in BA Control field 705 indicates HARQ ACK type (0 for normal BA). BA information subfield 715 indicates correctly received MPDUs from ongoing HARQ threads. HARQ ACK information subfield 720 contains ACK/NACK of HARQ coding words/units for ongoing HARQ threads. HARQ thread bitmap 725 indicates the index of the HARQ thread that includes the HARQ ACK bitmap 725. For example, 8 bits can be used to represent the status of 8 HARQ threads. HARQ ACK bitmaps 730 indicate acknowledgement (ACK)/no acknowledgment (NACK) of HARQ coding words/units for ongoing HARQ threads.

It should be appreciated that only HARQ coding units with errors are HARQ retransmitted in this embodiment. Moreover, according to some embodiments, in-band signaling feedback is used to reduce the processing time of preparing for retransmission HARQ coding units at TXOP initiator side.

Figure 8:
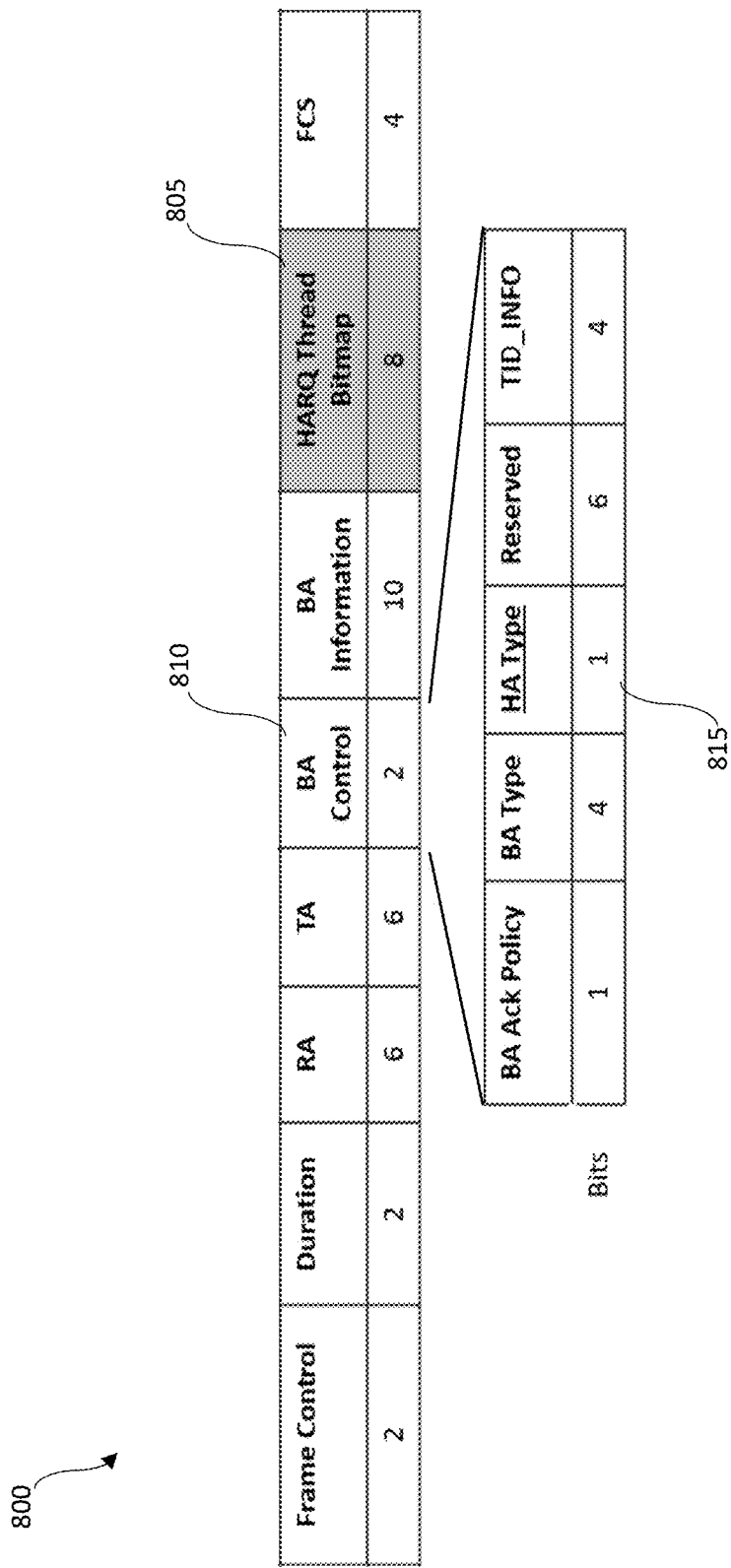
FIG. 8 is a block diagram of an exemplary HARQ Operation feedback element including a HARQ Thread Bitmap for performing a HARQ retransmission procedure using ARQ/HARQ thread level feedback according to embodiments of the present invention.

With regard to FIG. 8, an exemplary HARQ Operation feedback element 800 including HARQ Thread Bitmap 805 for performing a HARQ retransmission procedure using ARQ/HARQ coding word feedback is depicted according to embodiments of the present invention. HA Type subfield 815 in BA Control field 810 indicates HARQ ACK type. BA information subfield 815 indicates correctly received MPDUs from ongoing HARQ threads. HARQ thread bitmap indicates the index of HARQ threads for HARQ retransmission. For example, 8 bits can be used to represent the status of 8 HARQ threads, where a bit equal to "1" indicates HARQ threads needing HARQ retransmission. (a HARQ thread may not need HARQ retransmission when collision is detected).

The TXOP initiator can determine missing HARQ coding units for the HARQ threads as indicated in HARQ Thread bitmap 805. Missed MPDUs associated with HARQ coding words/threads can be determined based on BA information field 805. The TXOP initiator can look up mapping info for mapping missed MPDUs to HARQ coding units of HARQ threads using HARQ Thread bitmap 805. In this embodiment, all HARQ coding units (with or without errors) corresponding to missed MPDUs must be HARQ retransmitted unless MPDUs (or MPDU segments) correspond to a single HARQ coding unit.

Figure 9:
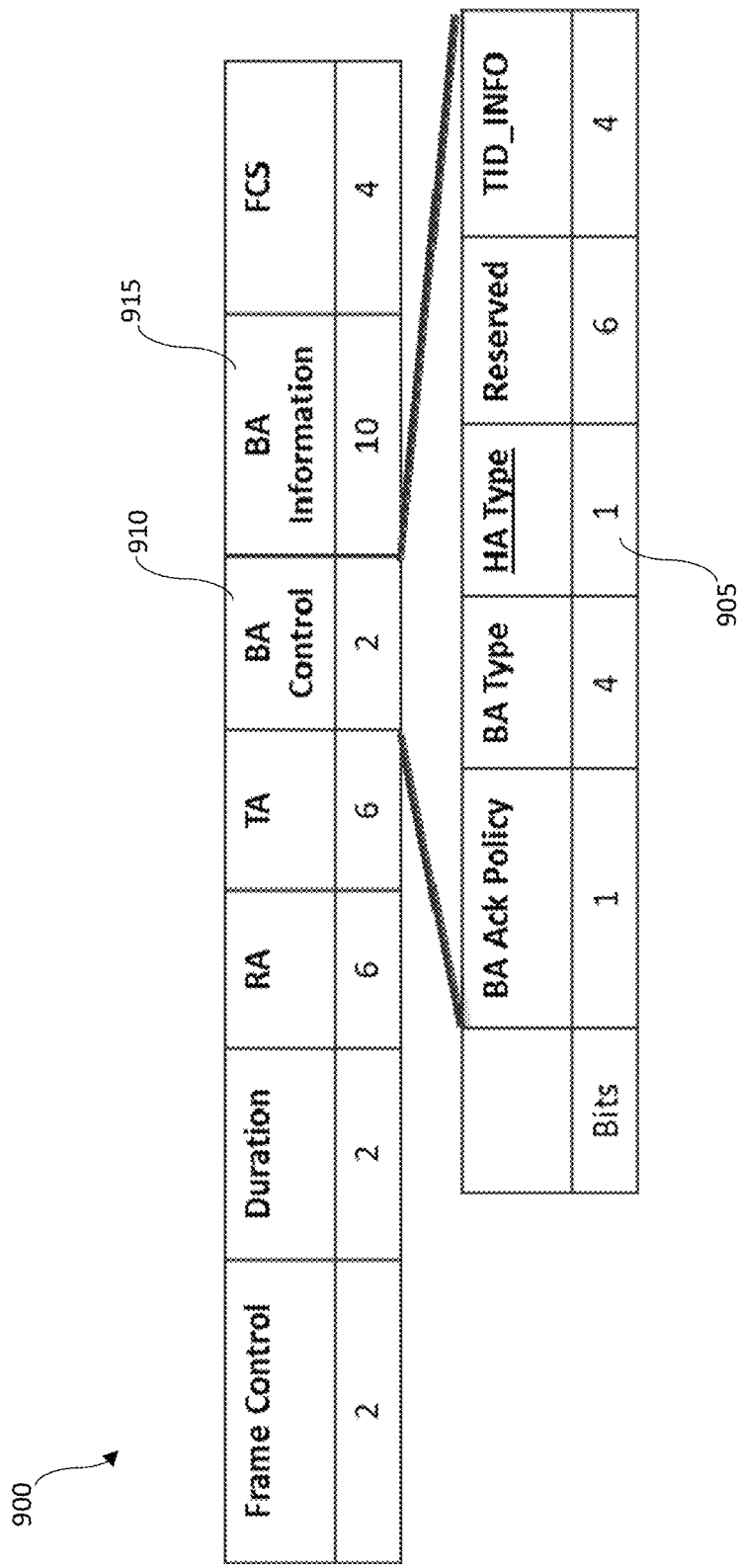
FIG. 9 is a block diagram of an exemplary HARQ retransmission procedure performed based on TXOP responder ARQ level feedback according to embodiments of the present invention.

With regard to FIG. 9, an exemplary HARQ retransmission procedure 900 performed based on TXOP responder ARQ level feedback is depicted according to embodiments of the present invention. A TXOP responder sends feedback using HA Type subfield 905 in BA Control field 910 to indicate the HARQ ACK type. BA information subfield 915 indicates correctly received MPDUs associated with ongoing HARQ threads. The TXOP initiator determines missed HARQ coding units for all ongoing HARQ threads. The TXOP initiator stores the mapping information between MPDUs and HARQ coding units for each HARQ thread. The TXOP initiator can determine missed HARQ coding units for each HARQ thread based on the missing MPDUs indicated in BA information subfield. For example, the TXOP initiator can look up mapping information for mapping missed MPDUs to HARQ coding units for each ongoing HARQ thread using BA information subfield 915. In this embodiment, all HARQ coding units (with or without errors) corresponding to missed MPDUs must be HARQ retransmitted unless MPDUs (or MPDU segments) correspond to a single HARQ coding unit.

Figure 10:
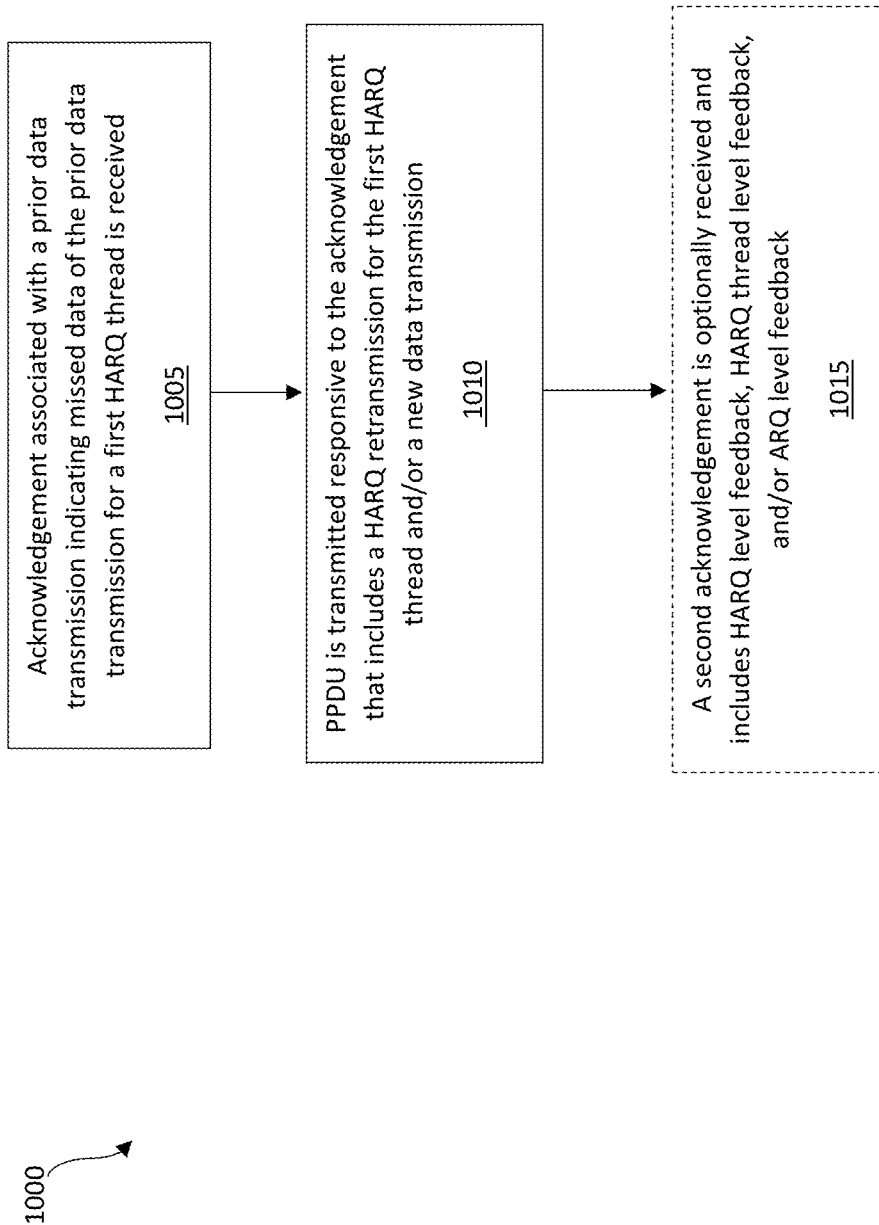
FIG. 10 is a flow chart depicting an exemplary sequence of steps for decoding a wireless data transmission using a plurality of HARQ threads according to embodiments of the present invention.

FIG. 10 depicts an exemplary sequence of computer implemented steps for performing a HARQ operation 1000 to retransmit data using a HARQ thread according to embodiments of the present invention.

At step 1005, an acknowledgement associated with a prior data transmission indicating missed data of the prior data transmission for a first HARQ thread is received.

At step 1010, a PPDU (e.g., an aggregated PPDU) is transmitted responsive to the acknowledgement that includes a HARQ retransmission for the first HARQ thread and/or a new data transmission (e.g., a PSDU). The PPDU can also include multiple HARQ threads, and a HARQ SIG field indicating thread information for the HARQ threads.

At step 1015, a second acknowledgement is optionally received and includes HARQ level feedback, HARQ thread level feedback, and/or ARQ level feedback.

Figure 11:
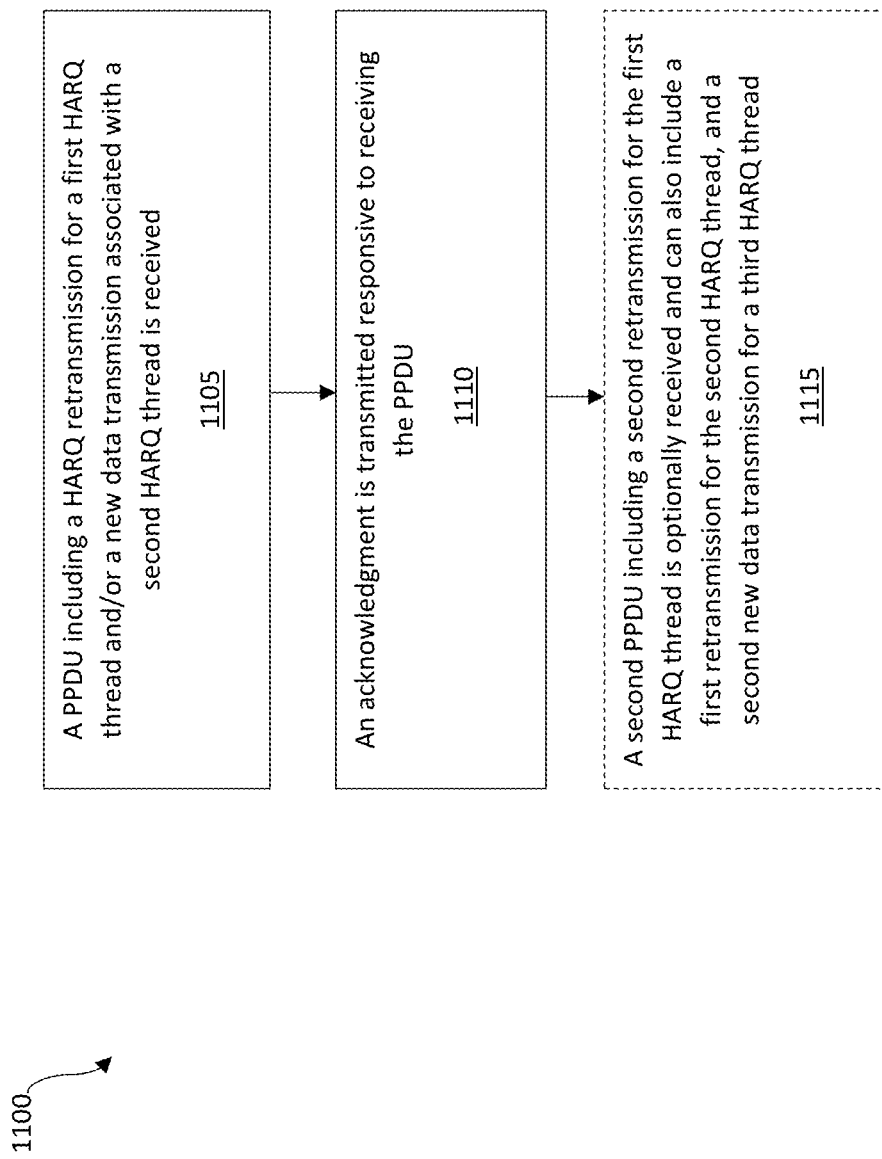
FIG. 11 is a flow chart depicting an exemplary sequence of computer implemented steps for performing a HARQ retransmission procedure for a HARQ thread according to embodiments of the present invention.

FIG. 11 depicts an exemplary sequence of computer implemented steps for performing a HARQ operation 1100 to acknowledge data associated with multiple HARQ threads according to embodiments of the present invention.

At step 1105, an PPDU (e.g., an aggregated PPDU) is received. The PPDU can include a HARQ retransmission for a first HARQ thread and/or a new data transmission associated with a second HARQ thread.

According to some embodiments, the PPDU also includes a second HARQ retransmission for a third HARQ thread, and the acknowledgment indicates acknowledged MPDUs of the first HARQ thread, the second HARQ thread, and/or the third HARQ thread.

At step 1110, an acknowledgment is transmitted responsive to receiving the PPDU. The acknowledgment indicates MPDUs of HARQ threads that are acknowledged, HARQ coding units of the HARQ threads that require HARQ retransmission, and/or that no HARQ coding units of the HARQ threads are acknowledged (NACK).

At step 1115, a second PPDU including a second retransmission for the first HARQ thread is optionally received. The second PPDU can also include a first retransmission for the second HARQ thread, and a second new data transmission for a third HARQ thread. The second PPDU is transmitted responsive to a device receiving the acknowledgment.

Figure 12:
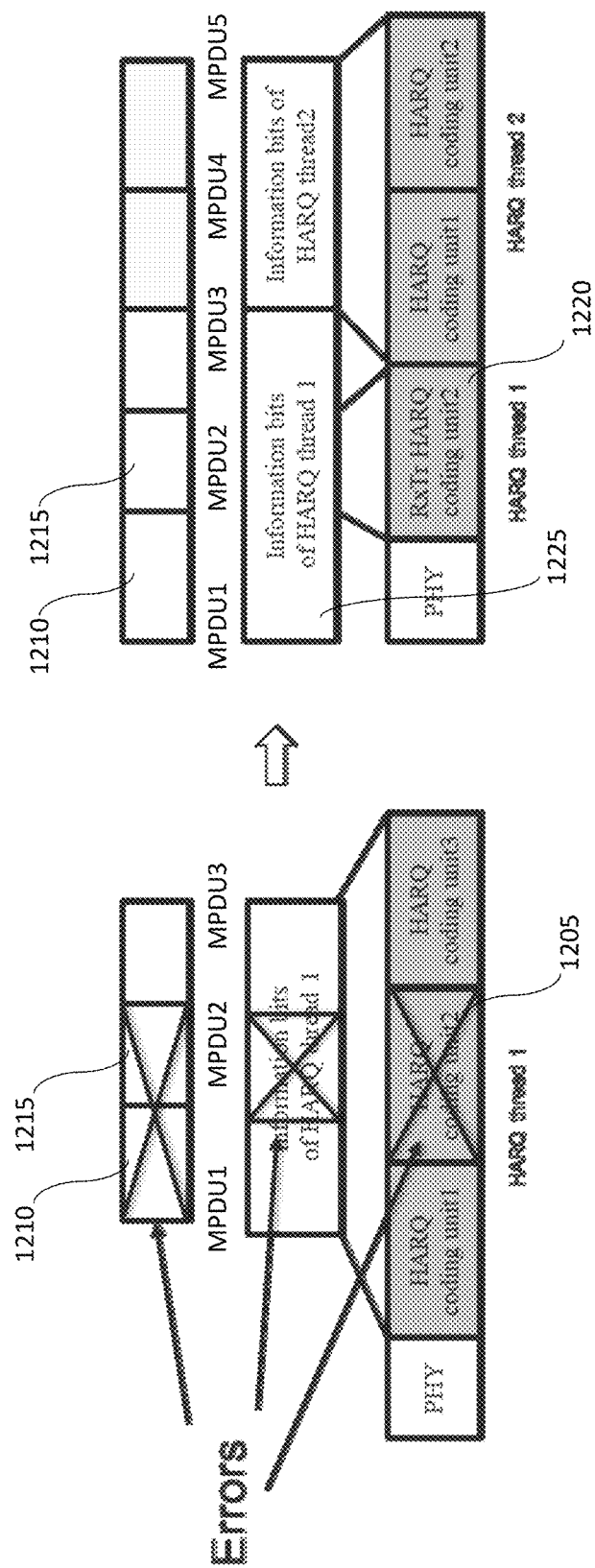
FIG. 12 is a flow chart depicting an exemplary sequence of computer implemented steps for acknowledging HARQ transmissions using multiple HARQ threads according to embodiments of the present invention.

FIG. 12 depicts an exemplary HARQ operation 1200 performed by a TXOP responder using multiple HARQ threads according to embodiments of the present invention. Based on HARQ thread information (e.g., a HARQ bitmap or other information carried in a HARQ SIG field), a TXOP responder stores information bits of each ongoing HARQ thread until the HARQ thread ends. The TXOP responder replaces the information bit block (with error) using a retransmitted information bit block and decodes the MPDUs from the information bits for a specific HARQ thread.

A HARQ thread ends when a HARQ thread condition is met as described below in Table I:
  all MPDUs associated with the HARQ thread have been received correctly
  all HARQ coding units are received with CRC check success;
  the number of retransmissions reaches to the maximum threshold for the HARQ thread;
  the TXOP responder fell back to ARQ scheme for the HARQ thread;
  the TXOP initiator flushes the HARQ thread with a new transmission; or
  the TXOP ends Table I The TXOP responder can clear the buffer of information bits for a HARQ thread when the HARQ thread ends.

As depicted in FIG. 12, HARQ coding unit 2 1205 of HARQ thread 1 is received with error. MPDU1 1210 and MPDU2 1215 are associated with HARQ thread 1 and HARQ coding unit 2 1205. Information bits of each ongoing HARQ thread can be retransmitted until the HARQ thread ends. HARQ coding unit 2 1205 is retransmitted in HARQ coding unit retransmission 1220 (associated with HARQ thread 1). The TXOP responder replaces the information bits of HARQ thread 1 1225 for MPDU1 and MPDU2 using the retransmitted information 1220. MPDU1 1210 and MPDU2 1215 are decoded from the information bits for a HARQ thread 1 1225. The TXOP responder can clear the buffer of information bits for a HARQ thread 1 when HARQ thread 1 ends.

Exemplary Computer Controlled System

Embodiments of the present invention are drawn to electronic systems for performing HARQ data retransmission using multiple HARQ threads. The following discussion describes one such exemplary electronic system or computer system that can be used as a platform for implementing embodiments of the present invention. The exemplary computer system 1312 can be a wireless access point or a wireless station, for example. Exemplary computer system 1312 can stores information for a set of ongoing HARQ threads in a buffer (e.g., memory 1302 and/or 1303). The TXOP responder can replace information bit block (associated with a HARQ thread) that were received with error using a retransmitted information bit block, and can decode MPDUs from the information bits for the associated HARQ thread. The TXOP responder can clear the buffer of information bits for a HARQ thread when the HARQ thread ends. The TXOP initiator can aggregate multiple HARQ threads within a single PPDU. HARQ thread information can be transmitted in a HARQ SIG field. The HARQ thread information can include a HARQ thread bitmap or HARQ thread information index.

Figure 13:
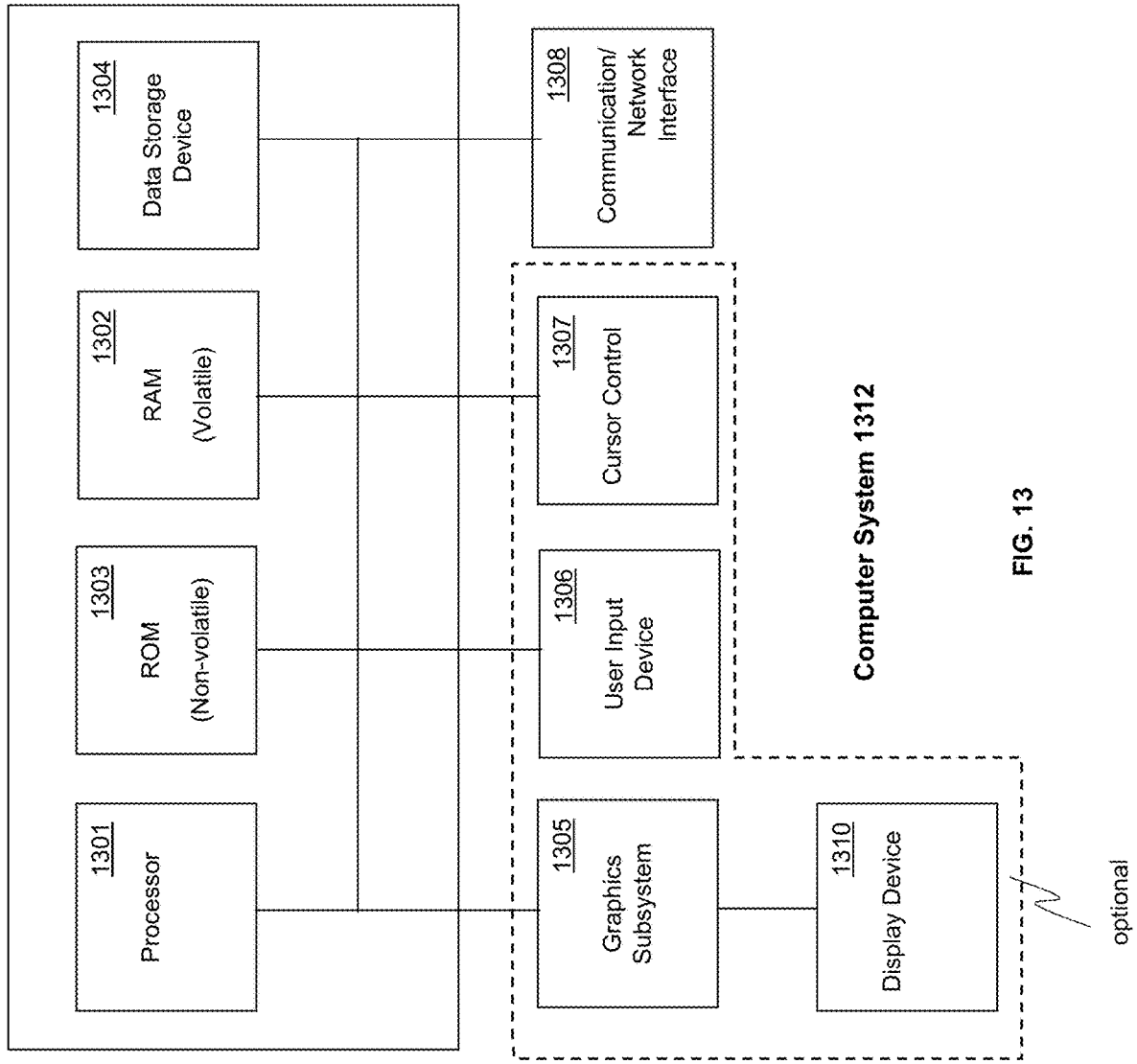
FIG. 13 is a block diagram depicting an exemplary computer system platform upon which embodiments of the present invention may be implemented.

In the example of FIG. 13, the exemplary computer system or wireless device includes a central processing unit (such as a processor or a CPU) 1301 for running software applications and optionally an operating system. Read-only memory 1302 and random access memory 1303 store applications and data for use by the CPU 1301. The processes depicted in FIGS. 10 and 11 can be stored as instructions in memory 1302/1303 and executed by processor 1301. Data storage device 1304 provides non-volatile storage for applications and data and may include fixed disk drives, removable disk drives, flash memory devices, and CD-ROM, DVD-ROM or other optical storage devices. The optional user inputs 1306 and 1307 comprise devices that communicate inputs from one or more users to the computer system 1312 (e.g., mice, joysticks, cameras, touch screens, and/or microphones).

A communication or network interface 1308 includes a plurality of transceivers and allows the computer system 1312 to communicate with other computer systems, networks, or devices via an electronic communications network, including wired and/or wireless communication and including an Intranet or the Internet (e.g., 802.11 wireless standard). According to embodiments of the present invention, the communication or network interface 1308 can operate multiple transceivers simultaneously. The communication or network interface 1308 can further include a cooperative management unit for coordinating the data sent and/or received by the transceivers.

The optional display device 1310 may be any device capable of displaying visual information in response to a signal from the computer system 1312 and may include a flat panel touch sensitive display, for example, and may be remotely disposed. The components of the computer system 1312, including the CPU 1301, memory 1302/1303, data storage 1304, user input devices 1306, and optional graphics subsystem 1305 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of retransmitting data using a hybrid automatic repeat request (HARQ) thread, the method comprising:
    receiving an acknowledgement associated with a prior data transmission indicating missed data of the prior data transmission for a first HARQ thread associated with a first HARQ thread index value; and
    based on the acknowledgment, transmitting a Physical Layer Convergence Procedure (PLCP) Protocol Data Unit (PPDU) comprising:
        a plurality of HARQ threads comprising the first HARQ thread;
        a HARQ SIG field indicating thread information for the plurality of HARQ threads, wherein the thread information comprises a number of orthogonal frequency-division multiplexing (OFDM) symbol segments for the plurality of HARQ threads;
        a first HARQ retransmission for the first HARQ thread;
        a new data transmission associated with an index value of a second HARQ thread of the plurality of HARQ threads; and
        a PHY header identifying the first HARQ thread index value and the second HARQ thread index value.

2. The method of claim 1, wherein the missed data of the prior data transmission comprises HARQ coding units corresponding to missed HARQ coding units.

3. The method of claim 1, wherein the new data transmission comprises a PLCP Service Data Unit (PSDU) for a second HARQ thread.

4. The method of claim 1, wherein the PPDU further comprises a second HARQ retransmission for a second HARQ thread.

5. The method of claim 1, further comprising receiving a second acknowledgement comprising a block acknowledgement (BA) for received PSDUs.

6. The method of claim 1, wherein the PPDU further comprises a plurality of HARQ threads, and the acknowledgement comprises:
    a block acknowledgement (BA) indicating received Media Access Control (MAC) Protocol Data Units (MPDUs) for the plurality of HARQ thread; and
    HARQ coding unit feedback for the plurality of HARQ threads.

7. The method of claim 1, wherein the acknowledgement comprises at least one of: a HARQ acknowledgment type indication set in a BA control field; a HARQ thread index indication for retransmission; and a HARQ coding unit indication for retransmission.

8. The method of claim 7, wherein the HARQ coding unit indication comprises a HARQ thread bitmap.

9. The method of claim 1, wherein the HARQ thread information further comprises HARQ thread transmission parameters for the plurality of HARQ threads.

10. A method of providing hybrid automatic repeat request (HARQ) feedback responsive to a HARQ transmission, the method comprising:
    receiving a Physical Layer Convergence Procedure (PLCP) Protocol Data Unit (PPDU) comprising at least one of:
        a HARQ retransmission for a first HARQ thread associated with a first HARQ thread index value;
        a new data transmission associated with a second HARQ thread associated with a second HARQ thread index value;
        a PHY header indicating the first HARQ thread index value and the second HARQ thread index value; and
        a HARQ SIG field indicating thread information for the first and second HARQ threads, wherein the thread information comprises a number of orthogonal frequency-division multiplexing (OFDM) symbol segments for the first and second HARQ threads; and
    transmitting an acknowledgment responsive to receiving the PPDU, wherein the acknowledgment indicates at least one of:
        MPDUs of HARQ threads that are acknowledged;
        HARQ coding units of the HARQ threads that require HARQ retransmission; and
        no HARQ coding units of the HARQ threads are acknowledged (NACK).

11. The method of claim 10, wherein the PPDU further comprises a second HARQ retransmission for a third HARQ thread, and wherein the acknowledgment indicates acknowledged MPDUs of at least one of: the first HARQ thread; the second HARQ thread; and the third HARQ thread.

12. The method of claim 10, further comprising receiving a second PPDU comprising a second retransmission for the first HARQ thread, a first retransmission for the second HARQ thread, and a second new data transmission for a third HARQ thread, wherein the second PPDU is transmitted responsive to a device receiving the acknowledgment.

13. The method of claim 10, wherein the acknowledgement comprises:
    a block acknowledgement (BA) indicating received Media Access Control (MAC) Protocol Data Units (MPDUs) for the HARQ thread; and
    HARQ coding unit feedback for the HARQ threads.

14. The method of claim 10, wherein the acknowledgement comprises at least one of: a HARQ acknowledgment type indication set in a BA control field; a HARQ thread index indication for retransmission; and a HARQ coding unit indication for retransmission.

15. The method of claim 14, wherein the HARQ coding unit indication comprises a HARQ thread bitmap.

16. A device for performing hybrid automatic repeat request (HARQ) retransmission in a wireless network, the device comprising:
- a transceiver configured to send and receive data on the wireless network;
- a memory; and
- a processor operable to cause the transceiver to:
  - receive an acknowledgement associated with a prior data transmission indicating missed data of the prior data transmission for a first HARQ thread associated with a first HARQ thread index value, wherein decoded data of the prior data transmission is stored in the memory; and
  - based on the acknowledgment, transmit a response Physical Layer Convergence Procedure (PLCP) Protocol Data Unit (PPDU) comprising:
    - a first HARQ retransmission for the first HARQ thread;
    - a new data transmission;
    - a PHY header identifying the first HARQ thread index value and the second HARQ thread index value; and
    - a HARQ SIG field indicating thread information for the first and second HARQ threads, wherein the thread information comprises a number of orthogonal frequency-division multiplexing (OFDM) symbol segments for the first and second HARQ threads.

17. The device of claim 16, wherein the PPDU further comprises a plurality of HARQ threads, and the acknowledgement comprises:
- a block acknowledgement (BA) indicating received Media Access Control (MAC) Protocol Data Units (MPDUs) for the plurality of HARQ threads; and
- HARQ coding unit feedback for the plurality of HARQ threads.

18. The device of claim 16, wherein the acknowledgement comprises at least one of: a HARQ acknowledgment type indication set in a BA control field; a HARQ thread index indication for retransmission; and a HARQ coding unit indication for retransmission.

19. The device of claim 18, wherein the HARQ coding unit indication comprises a HARQ thread bitmap.

* * * * *